US008122089B2

(12) United States Patent
Kay et al.

(10) Patent No.: US 8,122,089 B2
(45) Date of Patent: Feb. 21, 2012

(54) HIGH AVAILABILITY TRANSPORT

(75) Inventors: Jeffrey Kay, Bellevue, WA (US); Victor W. H. Boctor, Redmond, WA (US); Wilbert De Graaf, Bellevue, WA (US); Todd Luttinen, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 283 days.

(21) Appl. No.: 11/771,164

(22) Filed: Jun. 29, 2007

(65) Prior Publication Data

US 2009/0006564 A1 Jan. 1, 2009

(51) Int. Cl.
*G06F 15/16* (2006.01)
*G06F 11/00* (2006.01)

(52) U.S. Cl. ............ 709/206; 709/204; 709/224; 714/1; 714/2; 714/4.11; 714/6.1

(58) Field of Classification Search .................. 709/204, 709/208, 223, 206; 714/1
See application file for complete search history.

(56) References Cited

U.S. PATENT DOCUMENTS

| | | | |
|---|---|---|---|
| 5,596,720 A * | 1/1997 | Hamada et al. ............... 709/206 |
| 5,764,903 A * | 6/1998 | Yu ................................. 709/208 |
| 5,996,001 A * | 11/1999 | Quarles et al. ................ 709/203 |
| 6,535,991 B1 * | 3/2003 | Gallant et al. ..................... 714/4 |
| 6,694,471 B1 * | 2/2004 | Sharp ............................ 714/749 |
| 6,742,136 B2 * | 5/2004 | Christensen et al. ............. 714/5 |
| 6,792,085 B1 | 9/2004 | Rigaldies et al. .......... 379/88.13 |
| 6,892,221 B2 * | 5/2005 | Ricart et al. .................. 709/203 |
| 6,912,669 B2 * | 6/2005 | Hauck et al. ...................... 714/6 |
| 6,920,476 B2 * | 7/2005 | McGann et al. .............. 709/201 |
| 6,922,791 B2 | 7/2005 | Mashayekhi et al. ............. 714/4 |
| 6,944,788 B2 * | 9/2005 | Dinker et al. ...................... 714/4 |
| 6,957,251 B2 * | 10/2005 | Wisner et al. ................. 709/220 |
| 7,079,481 B2 * | 7/2006 | Kramer ......................... 370/218 |
| 7,165,082 B1 * | 1/2007 | DeVos ................... 707/999.202 |
| 7,177,917 B2 * | 2/2007 | Giotta ........................... 709/219 |
| 7,200,847 B2 | 4/2007 | Straube et al. ................ 719/313 |
| 7,466,648 B2 * | 12/2008 | Banks et al. .................. 370/225 |
| 7,480,918 B2 * | 1/2009 | Astl et al. ...................... 719/314 |
| 7,543,181 B2 * | 6/2009 | Buxton et al. .................. 714/15 |
| 7,584,256 B2 * | 9/2009 | Osborne et al. .............. 709/206 |
| 7,728,997 B2 * | 6/2010 | Koike et al. .................. 358/1.15 |
| 2002/0174260 A1 * | 11/2002 | Huang .......................... 709/313 |
| 2003/0206527 A1 * | 11/2003 | Yim ............................. 370/238 |
| 2004/0153511 A1 * | 8/2004 | Maynard et al. ............. 709/206 |
| 2004/0158766 A1 | 8/2004 | Liccione et al. ................... 714/4 |
| 2005/0037801 A1 * | 2/2005 | Moore ....................... 455/550.1 |
| 2005/0228867 A1 | 10/2005 | Osborne et al. .............. 709/206 |
| 2005/0283658 A1 | 12/2005 | Clark et al. ..................... 714/11 |

(Continued)

OTHER PUBLICATIONS

"Cluster Continuous Replication", Microsoft TechNet, 2007 Microsoft Corporation, http://technet.microsoft.com, 5 pages.

(Continued)

*Primary Examiner* — Kamal Divecha
(74) *Attorney, Agent, or Firm* — Woodcock Washburn LLP

(57) ABSTRACT

A system provides high availability electronic message forwarding. When an electronic message is communicated to a first server, a copy of the electronic message is maintained at a second server. The electronic message is maintained on both servers until the electronic message is successfully communicated to a third server. After the message is delivered to the third server, the electronic message is removed from both the first server and the second server. If the first server fails to communicate the electronic message to the third server, the second server does so.

7 Claims, 9 Drawing Sheets

U.S. PATENT DOCUMENTS

| | | | |
|---|---|---|---|
| 2006/0129650 A1* | 6/2006 | Ho et al. | 709/207 |
| 2006/0179147 A1* | 8/2006 | Tran et al. | 709/227 |
| 2006/0248373 A1 | 11/2006 | Warman et al. | 714/4 |
| 2007/0011358 A1* | 1/2007 | Wiegert et al. | 709/250 |
| 2007/0041327 A1* | 2/2007 | Foster et al. | 370/242 |
| 2007/0067399 A1* | 3/2007 | Kulkarni et al. | 709/206 |
| 2007/0136424 A1* | 6/2007 | Kato et al. | 709/204 |
| 2007/0204275 A1* | 8/2007 | Alshab et al. | 719/313 |
| 2008/0028028 A1* | 1/2008 | Chismark | 709/206 |
| 2010/0235676 A1* | 9/2010 | Aboel-Nil et al. | 714/4 |

OTHER PUBLICATIONS

"Veritas Storage Foundation™ HA for Windows® by Symantec Maintaining Optimum Availability in Microsoft® Exchange Environments", Symantec, 2006, 25 pages, http://eval.symantec.com.

Walther, H., Installing, Configuring and Testing an Exchange 2007 Cluster Continuous Replication (CCR) based Mailbox Server (Part 3), Nov. 21, 2006, http://www.msexchange.org, 10 pages.

* cited by examiner

HIGH AVAILABILITY TRANSPORT

BACKGROUND

Electronic messaging systems such as those for providing, for example, electronic mail and instant messaging, have become ubiquitous in modern society. Electronic messaging systems have been used for years in academic and corporate settings, and are now widely used in the individual consumer market. Indeed, electronic messaging has become so pervasive that it is quickly becoming a preferred means of communication for many corporations and individuals.

Generally, an electronic message is communicated through a plurality of messaging servers before it ultimately is saved in a message box of the intended recipient. For example, an electronic message may be received at a first messaging server, and then forwarded to a second messaging server, and then to a third messaging server, and so on until the messaging server is received at the messaging server responsible for receiving messages for the intended recipient. At each in the series of messaging servers that are responsible for communicating the electronic message, the electronic message is deleted after the messaging server forwards it to the next in the series. When the electronic message is received at the messaging server that services the intended recipient, the electronic message is stored in the recipient's message box.

SUMMARY

Systems and methods are disclosed herein for providing high availability transport of electronic messages.

An illustrative system may comprise a first messaging server, which may be referred to as a primary server, that is programmed to receive electronic messages and forward those messages to other messaging servers as part of a process of moving messages toward the mail box of the intended recipient. An illustrative system further comprises a second messaging server, which may be referred to as a shadow server, that is programmed to maintain a copy of electronic messages received at the primary server and deliver those electronic messages if the primary server should fail. In an exemplary system, the primary server and the shadow server are SMTP servers that communicate using SMTP.

An exemplary primary server is programmed to receive a communication indicating another server is prepared to deliver an electronic message to the primary server. The primary server identifies one or more additional servers to operate as a shadow server. The primary server may identify the shadow server by, for example, communicating with potential servers and/or by identifying the servers from a list of servers.

The primary server then receives the electronic message. Primary server also communicates the electronic message to the one or more servers that were identified as being shadow servers. The primary server may communicate the electronic message to the shadow server at any appropriate point in the processing. For example, in an exemplary embodiment, primary server may communicate the message to the shadow server concurrently with receiving the message. In another exemplary embodiment, primary server may communicate the electronic message to the shadow server after it has completed receiving the message.

If the primary server continues to operate as expected, it forwards the electronic message to a subsequent server as the message makes its way to its ultimate destination at the intended recipient's message box. After the primary server communicates the electronic message to a subsequent server, the primary server communicates to the shadow server that the message has been delivered. The primary server then deletes its copy of the message. In response to the communication from the primary server, the shadow server likewise deletes the message.

After receiving the copy of the electronic message, shadow server monitors the primary server and the status of the delivery of the electronic message. If the shadow server determines that the primary server has failed or is otherwise not available to communicate the electronic message to the destination, the shadow server itself communicates the electronic message to the appropriate destination.

In an alternate embodiment, the messaging server that initially communicates the electronic message to the primary server also operates as the shadow server. In such an embodiment, the server that forwards the electronic message recognizes that the primary server supports shadowing, communicates to the primary server that it will operate as a shadow server, and maintains a copy of the electronic message after it forwards the electronic message to the primary server. The primary server receives the electronic message and forwards the message to another server as the message progresses towards its intended destination. Upon delivering the electronic message to the next server, it communicates to the shadow server, i.e. the server from which it received the message, that the message has been delivered. In response to receiving this communication, the shadow server deletes the electronic message. If the message shadow server determines that the primary server has failed or otherwise not available to communicate, it assumes responsibility and communicates the electronic message.

This Summary is provided to introduce a selection of concepts in a simplified form that are further described below in the Detailed Description of Illustrative Embodiments. This Summary is not intended to identify key features or essential features of the claimed subject matter, nor is it intended to be used to limit the scope of the claimed subject matter. Other features are described below.

BRIEF DESCRIPTION OF THE DRAWINGS

The foregoing summary and the following additional description of the illustrative embodiments may be better understood when read in conjunction with the appended drawings. It is understood that potential embodiments of the disclosed systems and methods are not limited to those depicted.

DETAILED DESCRIPTION OF ILLUSTRATIVE EMBODIMENTS

Overview

In existing electronic messaging systems, such as those for transporting emails and instant messages, electronic messages are forwarded from server to sever until it reaches the server responsible for servicing the intended recipient. For example, in the case of an email, an email may be communicated from a first messaging server to a second messaging server and from the second messaging server to a third messaging server, and so on until the email is forwarded to the messaging server that services the message box of the intended recipient. At each server in the series of messaging servers that communicate an electronic message, after the message is forwarded to the next messaging server, the server deletes its copy of the electronic message. Thus, between the time that an electronic message is received at a server and forwarded to the next server, the electronic message may exist on that single server. If the server should fail, the electronic message may be lost.

Systems and methods that provide message redundancy during transport are disclosed herein. In an exemplary embodiment, when an electronic message is communicated to a first server, the electronic message is also maintained at a second server. The electronic message is maintained on both servers until the electronic message is successfully communicated to the next message server in the series of servers that are responsible for moving the message toward the server that services the intended recipient of the message. After the message is delivered by the first server, the electronic message may be removed from both the first server and the second server. If the first server should fail, the second server steps in and forwards the message to the appropriate server.

The disclosed methods may be implemented in commercial software and standard hardware. For example, in an embodiment of the disclosed systems and methods, the servers may be implemented as SMTP servers. Further, the SMTP servers may be implemented on off-the-shelf, low-cost computing hardware and may communicate using established networking technology and protocols.

Example Computing Arrangement

Figure 1:
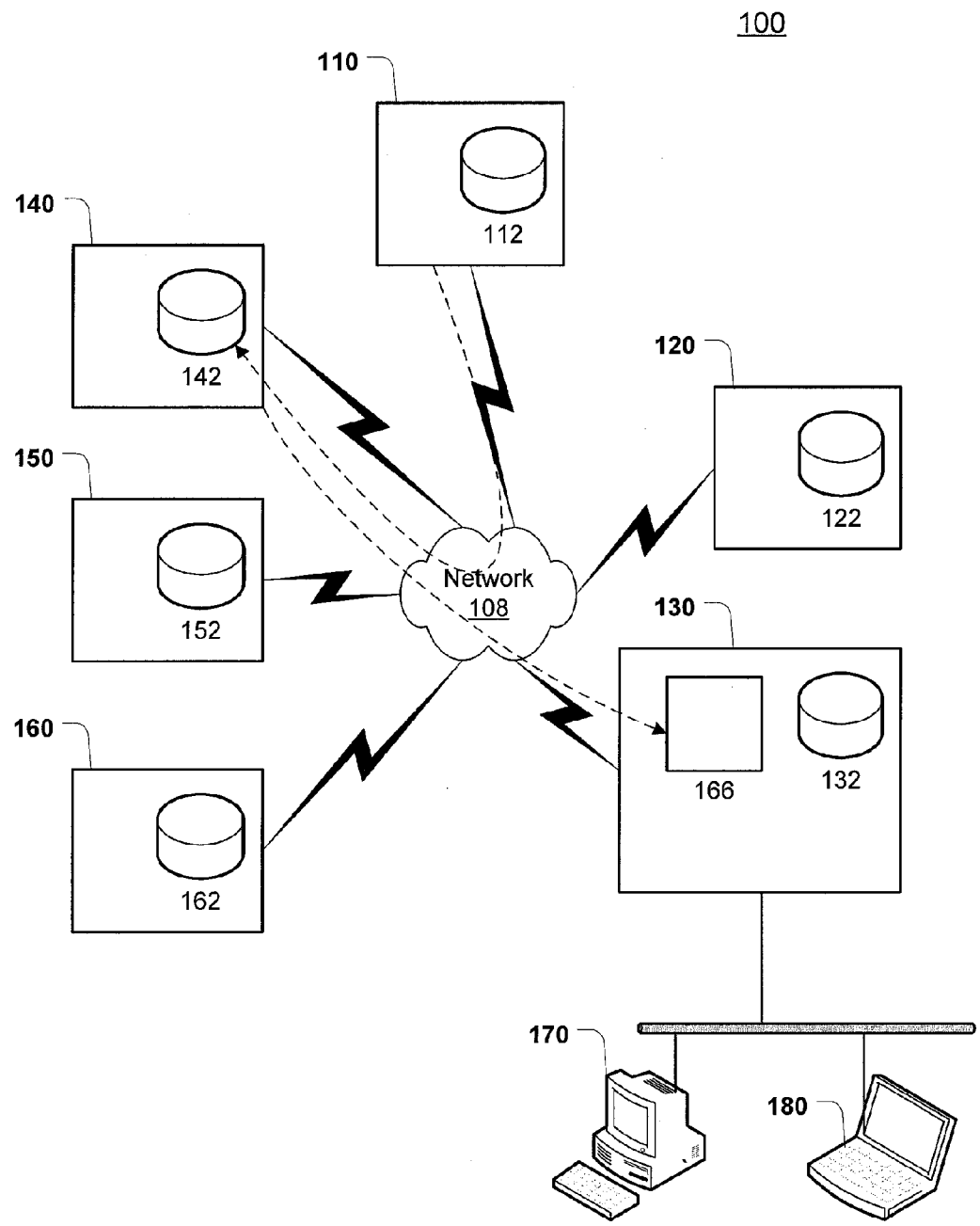
FIG. 1 is a network diagram of an illustrative computing arrangement in which aspects of the subject matter described herein may be implemented.

FIG. 1 illustrates an exemplary computing arrangement 100 suitable for providing redundant electronic messaging. In computing arrangement 100, each of a plurality of electronic messaging servers 110, 120, 130, 140, 150, and 160 is adapted to receive and forward electronic messages to their intended recipients. Each of servers 110, 120, 130, 140, 150, and 160 may be any suitable computing device that has been programmed with computer-readable instructions to operate as described herein to provide redundant message forwarding. In an exemplary embodiment, electronic messaging servers 110, 120, 130, 140, 150, and 160 may be, for example, SMTP servers adapted to forward email. Alternatively, messaging servers 110, 120, 130, 140, 150, and 160 may be, for example, instant messaging servers. Exemplary messaging servers 110, 120, 130, 140, 150, and 160 comprise storage areas 112, 122, 132, 142, 152, and 162, respectively, for storing electronic messages. Furthermore, each of messaging servers 110, 120, 130, 140, 150, and 160 comprise mailbox servers such as server 166 depicted in connection with messaging server 130. Mailbox server 166 is operable to deliver messages to individual users' mailboxes. It is noted that while six servers 110, 120, 130, 140, and 160 are depicted in FIG. 1, any number of plurality of servers may be comprised in arrangement 100.

Electronic messaging servers 110, 120, 130, 140, 150, and 160 are communicatively coupled to network 108. Network 108 is adapted to communicate electronic messages such as emails and may be any type of network suitable for the movement of data. For example, network 108 may be, or may comprise all, or a portion of, a local area network (LAN), public switched telephone network, the Internet, or any other network suitable for communicating data. Network 108 may comprise a combination of discrete networks which may use different technologies. For example, network 108 may comprise local area networks (LANs), wide area networks (WAN's), or combinations thereof and may employ any suitable topology including wireless and wireline networks.

In an exemplary embodiment, electronic messaging servers 110, 120, 130, 140, 150, and 160 are programmed to communicate with each other over network 108 to forward electronic messages toward an intended recipient. For example, and as designated by dotted lines in FIG. 1, an electronic message such as an email may be forwarded from messaging server 110 to messaging server 140, and then to messaging server 130. Messaging server 130 may correspond to the intended recipient of the electronic message and the electronic message placed in the individual user's mailbox by mailbox server 166. Users may access the electronic message using computing devices 170 and 180. Messaging servers 110, 120, 130, 140, 150, and 160 may communicate using any protocol(s) that are suitable for managing and communicating electronic messages. In an exemplary embodiment, the electronic message servers may communicate using SMTP.

In an exemplary embodiment, upon receipt at a server of a communication at one of messaging servers 110, 120, 130, 140, 150, and 160 that an electronic message is to be transmitted, the server, which may be referred to as the primary server, identifies another of the servers to operate as a shadow server for the particular electronic message. The shadow server may be the server that forwards the message to the primary server, or may be another of the servers in communication with the primary server. After a shadow server is identified, the primary server receives the electronic message and, if necessary, i.e. the shadow server is not the server forwarding the message to the primary server, transmits the electronic message to the shadow server as well. When the primary server successful forwards the electronic message to another server or forwards the message to the intended recipient's message box, the primary server notifies the shadow server of this and deletes the copy of the message on the primary server. In response to the notification from the primary server, the shadow server removes the electronic message. If the shadow server does not receive notification from the primary server that the primary server has forwarded the message, the shadow server may take responsibility and forward the electronic message.

Redundant Message Forwarding Method

Figure 2:
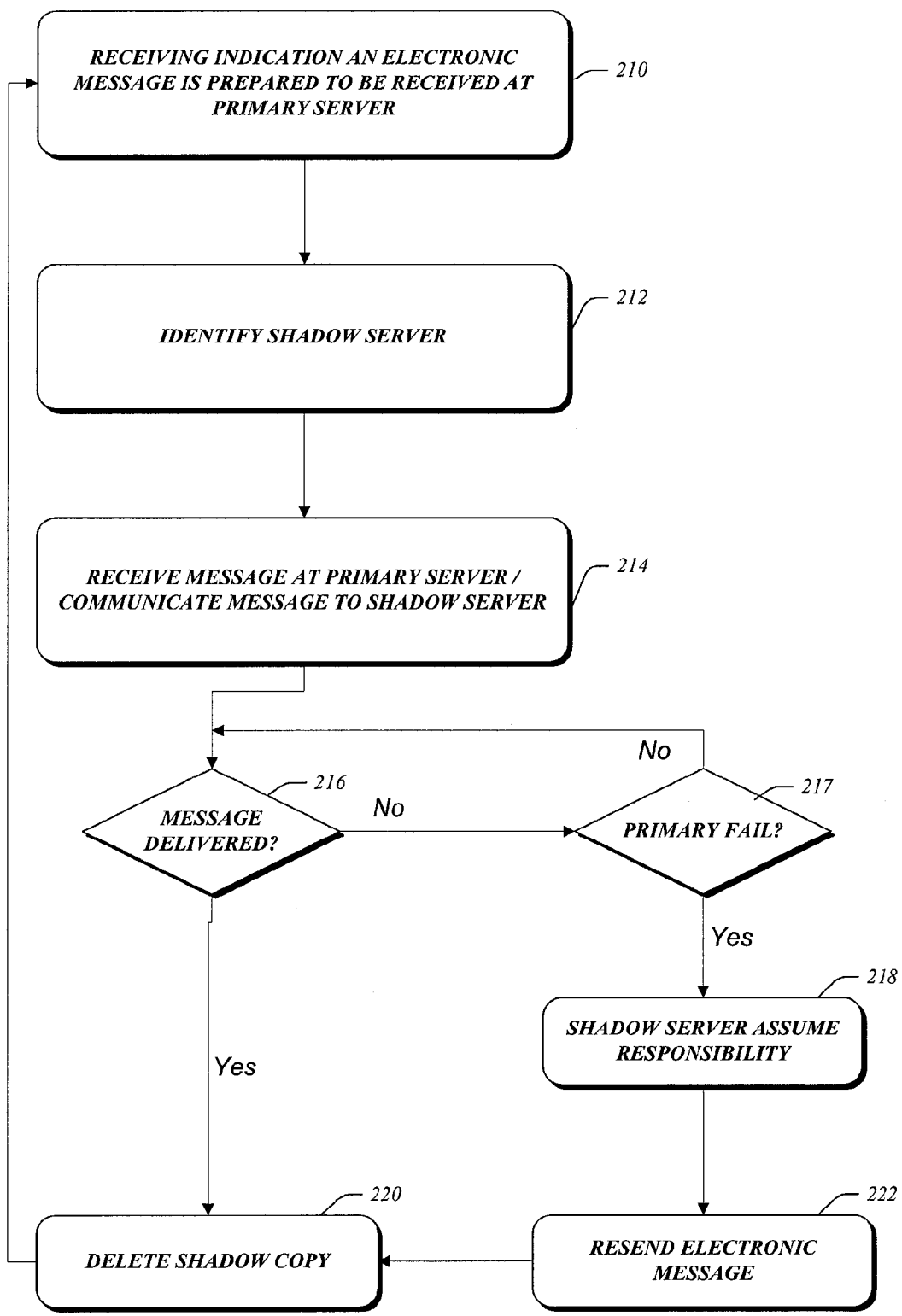
FIG. 2 is a flow diagram of a process for providing high availability electronic message transport.

FIG. 2 is a flow diagram of an example process for providing redundant electronic message forwarding. At step 210, a messaging server receives a communication indicating an electronic message is prepared to be forwarded to the particular server. For purposes of illustration, an electronic message may be received at server 110 indicating another server is prepared to forward an email. For purposes of this discussion, the messaging server that receives this communication and to which the electronic message is to be forwarded may be referred to as the primary server.

At step 212, primary server 110 identifies another messaging server to operate as a shadow server. In the embodiment described in connection with FIGS. 2 through 5, it is assumed that the shadow server is a server other than one from which the primary server received the electronic message. In another embodiment described below in connection with FIGS. 6 through 8, the server that forwards the electronic message to the primary server operates as the shadow server.

Referring to FIG. 2, at step 212, primary server 110 may identify a shadow server by any suitable method. For example, primary sever 110 may communicate a message to a particular sever and request that it operate in a shadow capacity for a particular message. The request may be, for example, an SMTP formatted request. In an alternative exemplary embodiment, primary server 110 may select a shadow server from a list of available servers. In an exemplary embodiment, primary server 110 may identify a plurality of messaging servers to operate as shadow servers for a single message. For purposes of illustration, it may be assumed that messaging server 150 has been identified by primary server 110 as the shadow server.

At step 214, primary server 110 receives and stores the message. For example, primary server 110 may store the message in a queue of messages that it maintains in memory which may be, for example, a disk and/or random access memory. The message may be received, for example, using SMTP protocol. Also at step 214, primary server 110 communicates a copy of the electronic message to shadow server 150. The electronic message may be communicated, for example, using SMTP protocol. In an exemplary embodiment, primary server 110 may receive the message and communicate it to shadow server 150 concurrently. Thus, the receiving and communicating may be accomplished nearly simultaneously. In another embodiment, primary server 110 may complete receiving of the electronic message prior to forwarding the message to shadow server 150.

At step 216, it is determined whether or not the message was delivered to the next location on its way to the intended recipient's message box. If the message has been delivered, at step 220 shadow server 150 deletes the electronic message. Primary server 110 likewise deletes its copy of the message.

However, if at step 216 it is determined that the message has not been delivered, at step 217, it is determined whether or not primary server 110 has failed. Primary server 110 may fail due to, for example, a malfunction or having been taken off-line. If primary server 110 has not failed, processing continues at step 216. However, if it is determined at step 217 that primary server 110 has failed, at step 218 shadow server 150 assumes responsibility for completing delivery and at step 222 forwards the electronic message to the appropriate machine.

Figure 3:
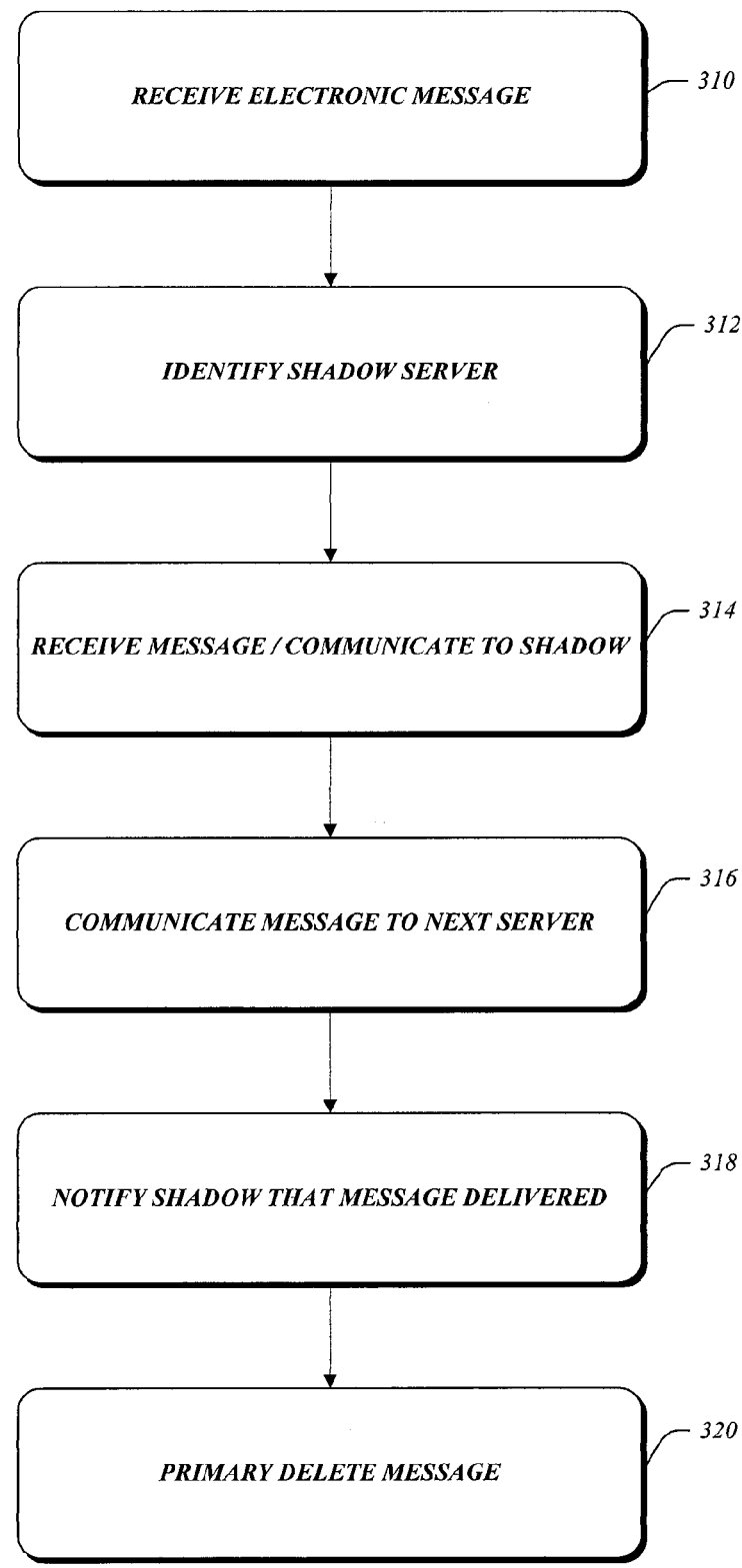
FIG. 3 is a flow diagram of a process for receiving electronic messages for which high availability message transport is provided.

FIG. 3 provides a flow diagram of a process for receiving an electronic message for which high availability forwarding is to be provided. At step 310, a communication is received indicating an electronic message is prepared for communication to the server. Again, for illustrative purposes, it may be assumed that the communication is received at primary server 110. The communication may be, for example, an SMTP communication indicating an email is prepared to be forwarded to primary server 110.

At step 312, server 110 identifies at least one server to have responsibility for shadowing the forwarding of the electronic message. Any suitable method may be employed to identify one or more shadow servers. For example, primary server 110 may select a shadow server from a list of available servers. For purposes of illustration, at step 312, server 150 may be identified as the shadow server.

It will be appreciated that more than one server may be identified as having responsibility for shadowing the process of forwarding an electronic message. For example, multiple servers may be identified to shadow so as to provide multiple redundancies in forwarding an electronic message. Further, any suitable logic may be used to identify one or more shadow servers. For example, a shadow server may be identified as a consequence of its being located on a different network or at a physically remote site and thereby offering additional levels of fault tolerance.

At step 314, primary server 110 receives the electronic message and communicates the electronic message to shadow server 150. Primary server 110 may be, for example, an SMTP sever and receive the electronic message using the SMTP protocol. In an exemplary embodiment, primary server 110 may store the message on disk and track the message in a queue maintained on disk. Primary server 110 also communicates the electronic message to shadow server 150. In an exemplary embodiment wherein primary server 110 and shadow server 150 are SMTP servers, the electronic message is communicated using SMTP. In an exemplary embodiment, primary server 110 may complete receiving of the electronic message prior to forwarding the message to shadow server 150. In such an embodiment, the primary server 110 completes forwarding the message to shadow server 150 prior to the server that is sending the message to primary server 110 deleting its copy of the message. In an alternative exemplary embodiment, primary server 110 may receive the message and communicate the message to shadow server 150 concurrently. Concurrent delivery offers the possibility of reducing time spent with providing redundancy. In a potential embodiment, the SMTP protocol may be modified to automatically communicate electronic messages to the target server and the shadow server.

At step 316, primary server 110 communicates the electronic message to the next server on the electronic message's path toward its intended recipient. For example, primary server 110 may forward the electronic message to server 130 where it may be stored in the message box of the intended recipient who accesses his/her message box from computing devices 170 and 180. In an embodiment wherein primary server 110 and 130 are SMTP servers, an email may be forwarded using SMTP.

At step 318, primary server 110 notifies shadow server 150 that primary server 110 has delivered the particular message to the appropriate server. Primary server 110 may notify shadow server 150 in any suitable method. In an exemplary embodiment, primary server 110 may make a communication especially for the purpose of notifying shadow server 150. The communication may specify, for example, the identity of the message and the time that it was forwarded. In another exemplary embodiment, primary server 110 may communicate that the message has been forwarded in connection with a communication for some other purpose. For example, primary server 110 may notify shadow server 150 in connection with a subsequent request that shadow server 150 operate as a shadow server in connection with another electronic message.

Having safely completed forwarding the electronic message, at step 320, primary sever 110 removes the electronic message from its memory.

Figure 4:
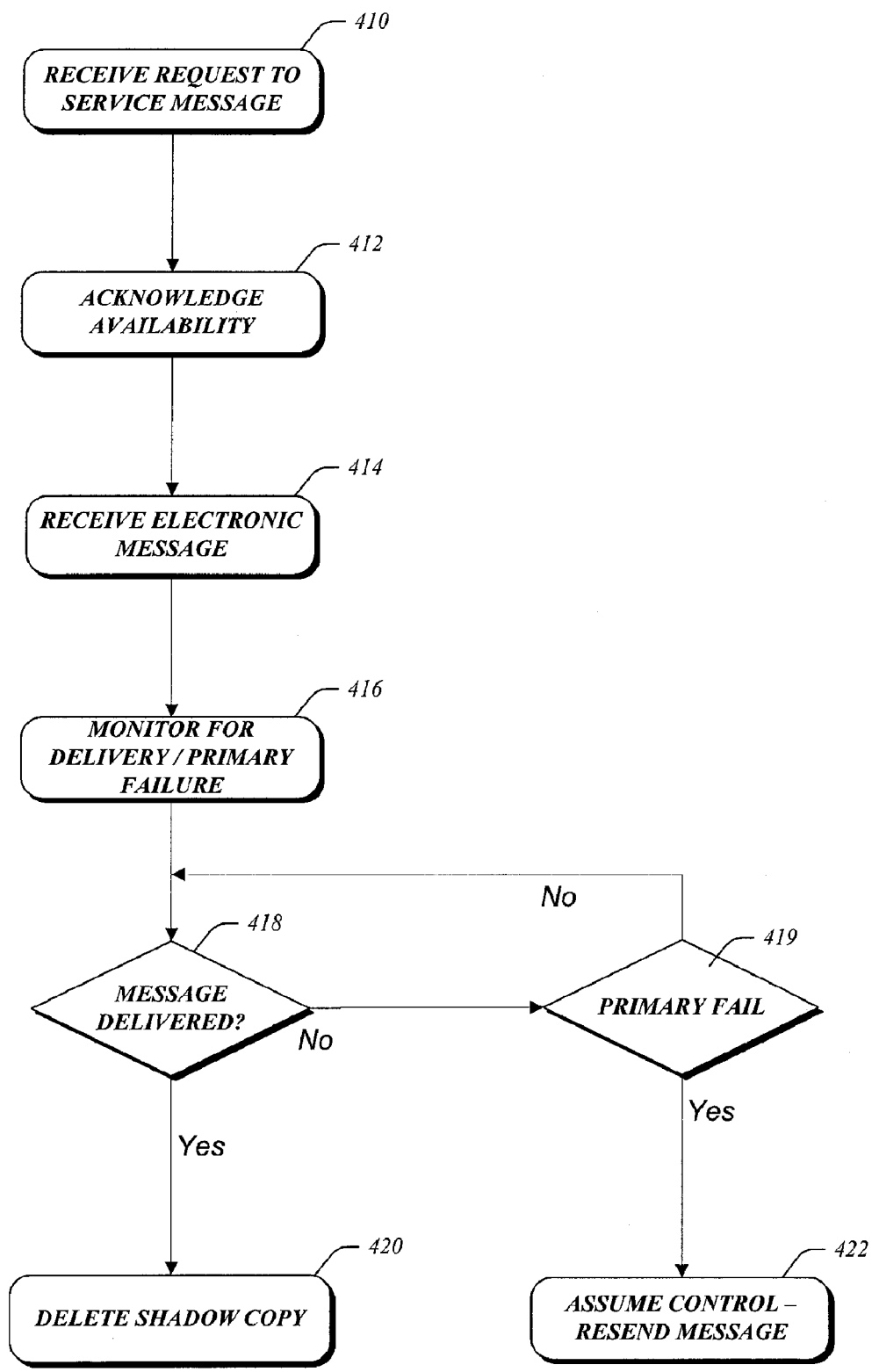
FIG. 4 is a flow diagram of a process for providing high availability in electronic message forwarding.

FIG. 4 is a flow chart of exemplary processing at a shadow server. As shown, at step 410, shadow server 150 receives a request from primary server 110 that it operate as a shadow server. In an exemplary embodiment, communication between the servers takes place using SMTP.

At step 412, shadow server 150 acknowledges that it is available to operate as a shadow server for the particular electronic message. At step 414, shadow server 150 receives a copy of the electronic message and stores it in memory. In an exemplary embodiment, shadow server 150 may place the message in queue of messages for which it has assumed shadowing responsibility.

At step 416, shadow server 150 monitors for an indication that primary server 110 has forwarded the electronic message to its next location on its way to its ultimate destination at the intended recipients message box. In particular, shadow server 150 may monitor for a communication from primary server 110 indicating the message has been delivered.

At step 418, shadow server 150 makes a determination about whether the electronic message was likely successfully communicated by primary server 110. If at step 418, shadow server 150 determines that the message has likely been successfully communicated by primary server 110, at step 420, shadow server 150 deletes its copy of the message. It should be noted that in some circumstances, an electronic message may have multiple intended recipients and primary server 110 is responsible for forwarding the electronic message separately for each of the multiple intended recipients. For such instances, shadow server 150 may be adapted to maintain its copy of the electronic message until it has determined/received an indication that the electronic message has been forwarded to all of the plurality of intended recipients.

If at step 418, shadow server 150 determines that the message has likely not been communicated, at step 419, it is determined whether or not primary server 110 has failed. Primary server 110 may fail due to, for example, a malfunction or having been taken off-line. Shadow server 150 may determine whether or not primary server 110 has failed by sending a request for primary server 110 to respond. If it is determined at step 419 that primary server 110 likely has not failed, processing continues at step 418. However, if it is determined at step 419 that primary server 110 has failed, at step 422 shadow server 150 assumes responsibility for completing delivery and resends the message.

Figure 5:
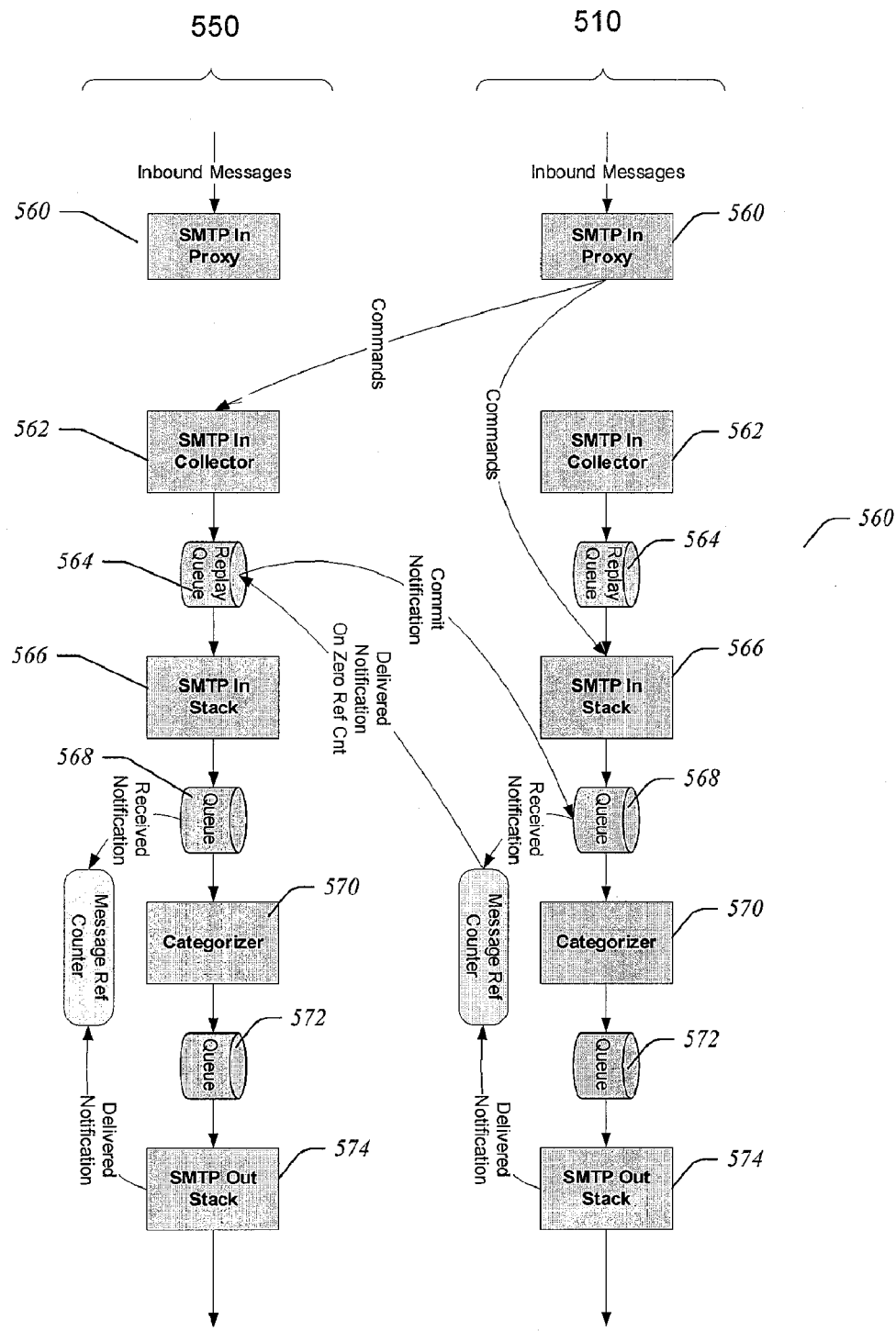
FIG. 5 is a diagram depicting components of exemplary SMTP servers adapted to provide high availability message transport.

FIG. 5 is depicts components of two exemplary SMTP servers adapted to provide redundant electronic message transport. For illustrative purposes the depicted servers may be referred to as primary server 510 and shadow server 550. Each of servers 510 and 550 comprise an SMTP Proxy 560 adapted to receive communications indicating a message is prepared to be forwarded to the particular server. Thus, when primary server 510 receives a communication indicating an electronic message is ready for delivery, the communication is handled by SMTP In Proxy 560. Furthermore, SMTP Proxy 560 is adapted to communicate incoming electronic messages to both the server which it is associated, e.g. primary server 510, and to a shadow server 550. Those skilled in the art will appreciate that in an exemplary embodiment SMTP Proxy 560 may be implemented as a separate server machine from the remaining components of primary server 510.

Severs 510 and 550 also comprise SMTP In Collector 562 that is adapted to receive electronic messages that are to be shadowed on the particular machine. Replay Queue 564 is a storage area for electronic messages that are being shadowed on the particular server machine. The Replay Queue identifies which messages are stored on behalf of which users. When shadow server 550 receives an electronic message from SMTP In Proxy 560 of primary server 510, the electronic message is received at SMTP In Collector 562 and stored in Replay Queue 564.

SMTP In Stack 566 is adapted to perform initial processing of electronic messages that have been received at the particular server and for which the particular server is responsible for subsequent delivery. SMTP In Stack 566 receives electronic message from SMTP In Proxy 560 and stores the messages in pre-categorization queue 568.

Categorizer 570 is adapted to determine how and where the messages in pre-categorization queue 568 are to be delivered. Categorizer 570 may use message header information to determine where the message should be directed. After messages are processed by categorizer 570, they are stored in post-categorization queue 572 for delivery.

SMTP Out Stack 574 is adapted to communicate electronic messages that are stored in post-categorization queue 572. SMTP Out Stack 574 is also adapted to notify Replay Queue 564 located on shadow server 550 that the message has been delivered.

In an illustrative scenario, SMTP In Proxy 560 of primary server 510 receives a communication indicating an electronic message is prepared for delivery to primary server 510. SMTP In Proxy 560 identifies server 550 to be the shadow server for the particular message. SMTP In Proxy 560 communicates the electronic message to SMTP In Collector 562 of shadow server 550 as it is received at SMTP In Stack 566 of primary server 510. In an example embodiment, the SMTP protocol is modified in such a way that SMTP communications including responses are aggregated by SMTP In Proxy 560 and then appended to the shadow stream. This has a pipelining effect allowing data to be sent to two (or more) places virtually simultaneously and then have the status (return codes) from the primary SMTP transaction appended to the shadow session for processing.

SMTP In Stack 566 stores the electronic message in pre-categorization queue 568. SMTP In Collector 562 stores the shadow copy of the electronic message in Replay Queue 564.

Categorizer 570 processes the electronic message to identify how and where it should be forwarded and stores the message along with address information in post-categorization queue 572.

SMTP Out Stack 574 retrieves the message from queue 572 and delivers it to the appropriate server as dictated by the information determined by Categorizer 570. SMTP Out Stack 574 removes the message from queue 572 and notifies Replay Queue 564 of shadow server 550 that the message has been delivered. Replay Queue 564 may then delete the shadow copy of the message.

When a shadow copy of an electronic message is received in Replay Queue 564, shadow sever 550 begins to monitor whether primary server 510 is successful in delivering the message. If shadow server 550 determines that primary server has likely not been successful, shadow server 550 will take control and deliver the electronic message using its normal procedures. In such an instance, the electronic message is received by SMTP In Stack 566 of shadow server 550 and processing begins as described above in connection with primary server 510.

Additional Redundant Message Forwarding Method

In the embodiment of providing redundant message forwarding described in connection with FIGS. 2 through 5, it is assumed that the shadow server is a server other than one from which the primary server received the electronic message. In another embodiment, described in connection with FIGS. 6 through 8, the server that forwards the electronic message to the primary server operates as the shadow server. According to the method of FIGS. 6 through 8, the server that forwards an electronic message maintains a shadow copy of the message until the server that receives the message provides an indication that the message has been forwarded to yet another server.

Figure 6:
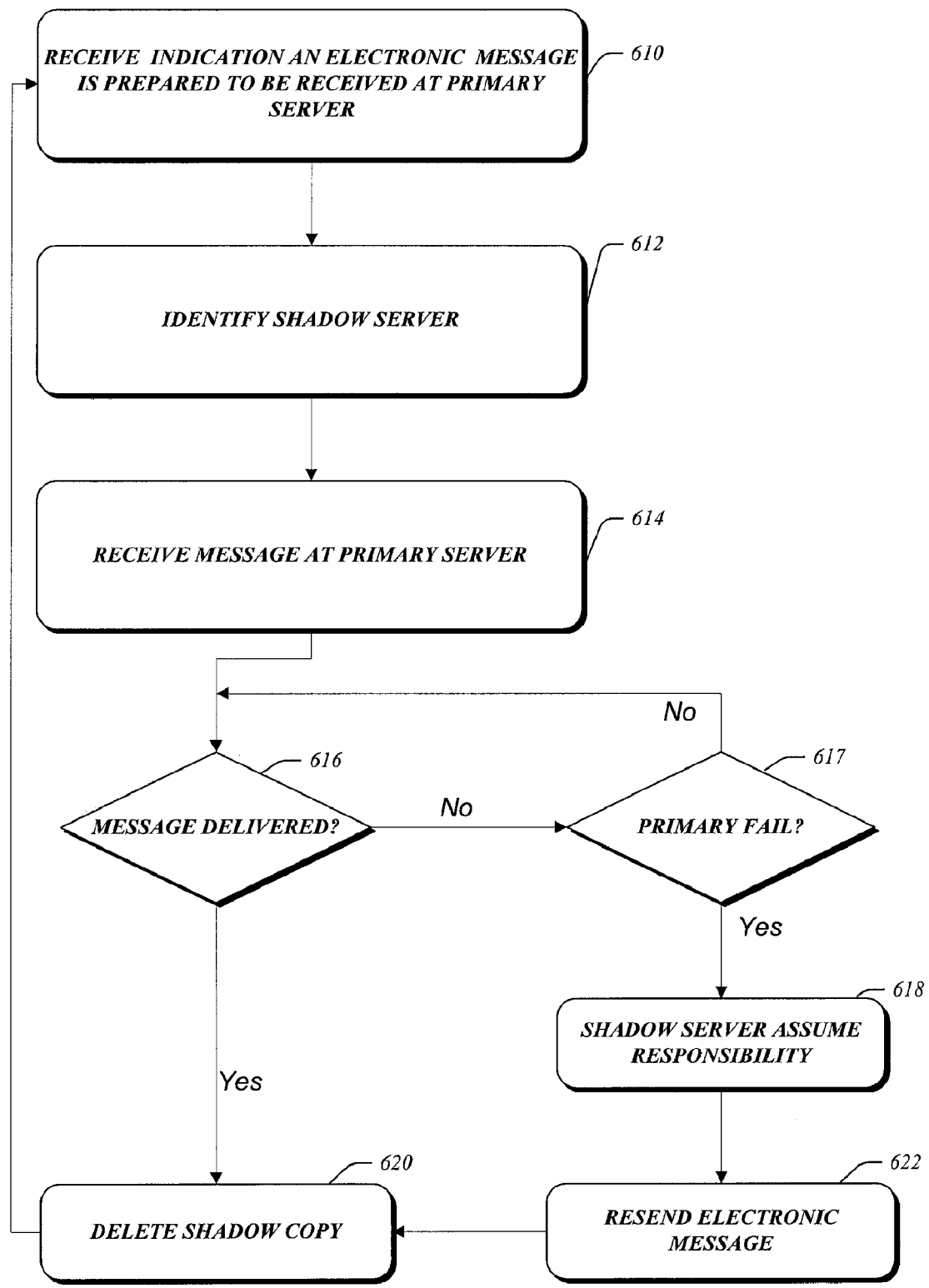
FIG. 6 is a flow diagram of a process for providing high availability electronic message transport.

As shown in FIG. 6, at step 610, a first message server provides notice to another message server that a message is prepared to be forwarded to the second message server. For purposes of illustration, server 110 of FIG. 1 may communicate to server 120 that an electronic message is prepared to be forwarded by server 110 to server 120. For purposes of this discussion, the message server that receives this communication and to which the electronic message is to be forwarded may be referred to as the primary server.

At step 612, server 110 communicates to primary server 120 that it will maintain a shadow copy of the electronic message until primary server 120 delivers the message to another server. In other words, server 110 communicates that it will operate as the shadow server for purposes of the particular electronic message. The communication may be, for example, an SMTP formatted communication.

At step 614, primary server 120 receives and stores the message. For example, primary server 120 may store the message in a queue of messages that it maintains in memory which may be, for example, a disk and/or random access memory. The message may be received, for example, using SMTP protocol.

At step 616, it is determined by the shadow server whether primary server 120 likely delivered the electronic message to the next location on its way to the intended recipient's message box. If the message was delivered, at step 620, shadow server 110 deletes the shadow copy of the message. Primary server 120 likewise deletes its copy.

If the message has likely not been delivered, at step 617, shadow server 110 determines whether or not primary server 120 has failed. For example, shadow server 110 may query primary server 120 for status. If primary server 120 has not failed, processing continues at step 616. However, if at step 617 it is determined that primary server 120 has likely failed, at step 618 shadow server 150 assumes responsibility for completing delivery and at step 622 resends the electronic message to the appropriate machine.

Figure 7:
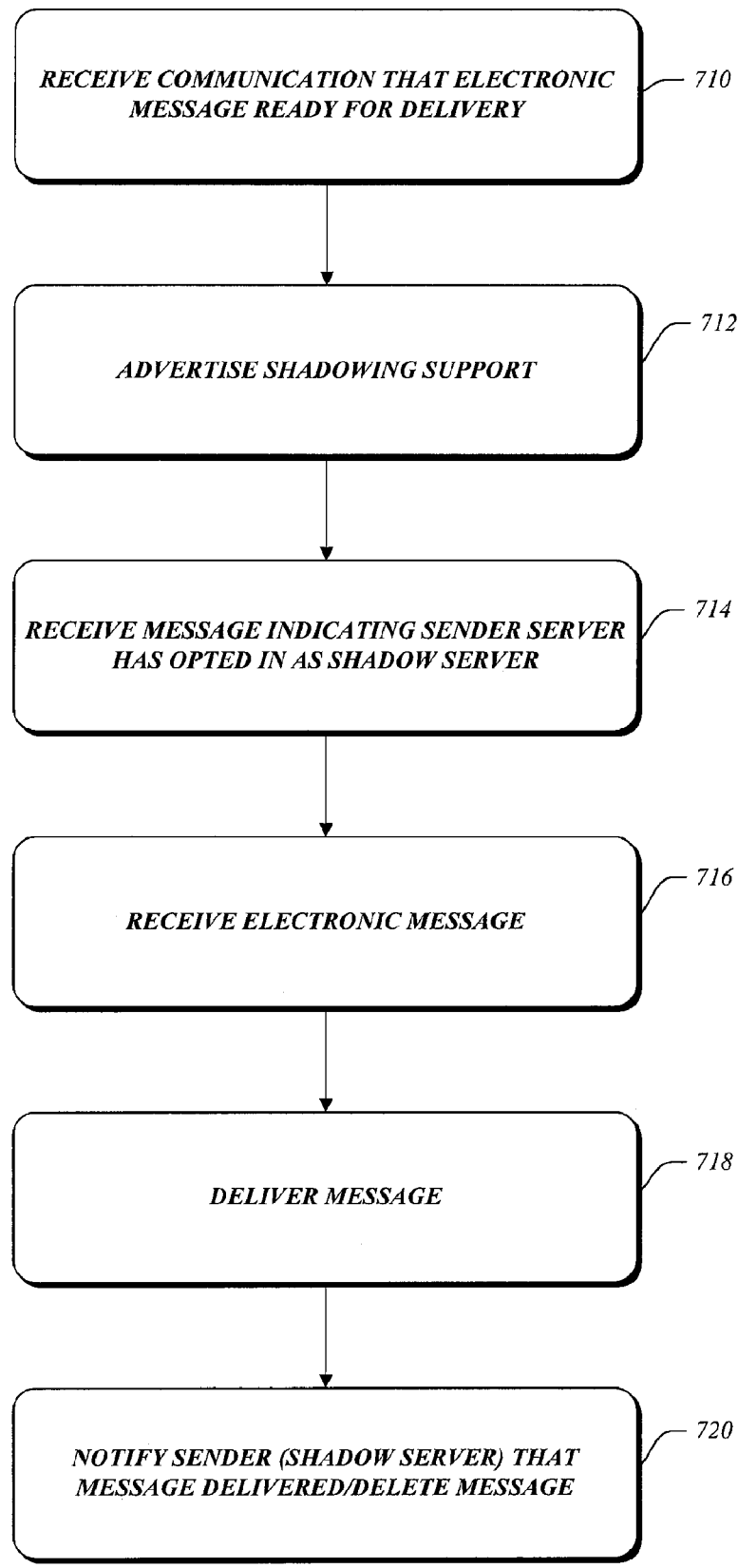
FIG. 7 is a flow diagram of a process for receiving electronic messages for which high availability message transport is provided.

FIG. 7 provides a flow diagram of a process for receiving an electronic message for which high availability forwarding is to be provided. At step 710, a communication is received at a server indicating an electronic message is prepared for communication to the server. Again, for illustrative purposes, it may be assumed that the communication is sent form server 110 and received at primary server 120. The communication may be, for example, an SMTP communication indicating an email is prepared to be forwarded to primary server 120.

At step 712, primary server 120 advertises that it supports redundant message forwarding. In other words, primary server 120, having received notification that a message is going to be forwarded to it, makes it known that it is operable to work with a shadow server to provide redundant communication.

At step 714, primary server 120 receives a communication from server 110 that server 110 has opted-in as the shadow server for the particular electronic communication. In other words, server 110 that is sending the electronic message communicates to primary server 120 that it will maintain a copy of the message after sending it to primary server 120.

At step 716, primary server 120 receives the electronic message. Primary server 120 may be, for example, an SMTP sever and receive the electronic message using the SMTP protocol. In an exemplary embodiment, primary server 120 may store the message on disk and track the message in a queue maintained on disk.

At step 718, primary server 120 communicates the electronic message to the next server on the electronic message's path toward its intended recipient. For example, primary server 120 may forward the electronic message to server 130 where it may be stored in the message box of the intended recipient who accesses his/her message box from computing devices 170 and 180. In an embodiment wherein primary server 120 and receiving server 130 are SMTP servers, an email may be forwarded using SMTP.

At step 720, primary server 120 notifies shadow server 110 that primary server 120 has delivered the particular message to the appropriate server. Primary server 120 may notify shadow server 120 in any suitable method. In an exemplary embodiment, primary server 120 may make a communication especially for the purpose of notifying shadow server 120. The communication may specify, for example, the identity of the message and the time that it was forwarded. Having safely completed forwarding the electronic message, primary sever 110 removes the electronic message from its memory.

Figure 8:
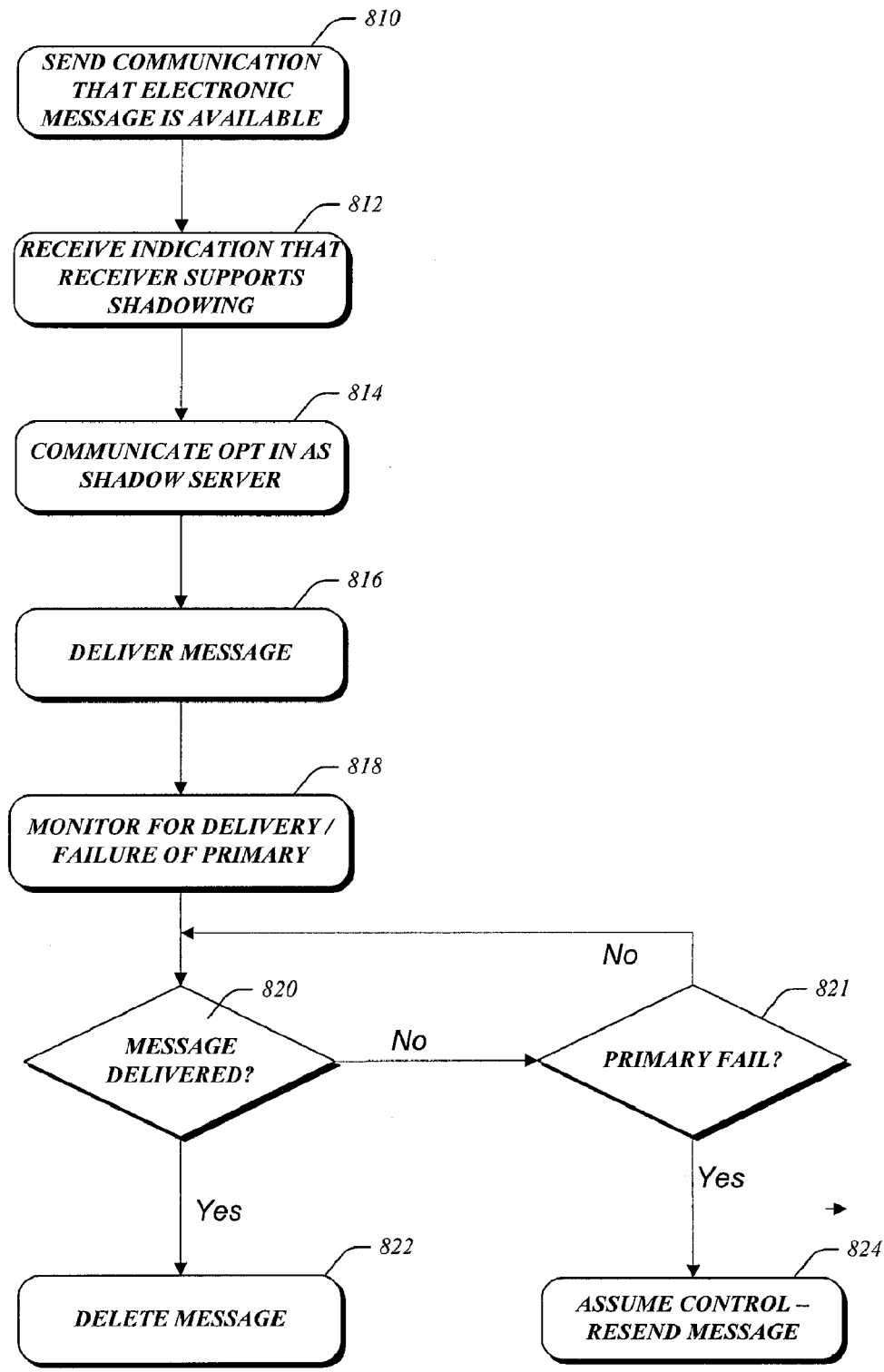
FIG. 8 is a flow diagram of a process for providing high availability in electronic message forwarding.

FIG. 8 is a flow chart of exemplary processing at a shadow server wherein the shadow server is the server that forwards the electronic message to the primary server. As shown, at step 810, server 110 communicates to primary server 120 that an electronic message is available for delivery. In an exemplary embodiment, communication between the servers takes place using SMTP.

At step 812, server 110 receives an indication from primary server 120 that the primary server supports shadowing of electronic messages.

At step 814, server 110 communicates to primary server 120 that server 110 will operate as the shadow server for purposes of the particular electronic message. At this point, server 110, which may be referred to as the shadow server, may begin tracking the electronic message as being shadowed on server 110. In an exemplary embodiment, shadow server 110 may place the message in queue of messages for which it has assumed shadowing responsibility.

At step 816, server 110 delivers the message to primary server 120.

At step 818, shadow server 110 monitors for an indication that primary server 120 has delivered the electronic message to its next location on its way to its ultimate destination at the intended recipients message box. In particular, shadow server 110 may monitor for a communication from primary server 120 indicating the message has been delivered.

At step 820, shadow server 110 makes a determination about whether or not the electronic message was likely successfully communicated by primary server 120. If at step 820, shadow server 110 determines that the message has likely been successfully delivered by primary server 120, at step 822, shadow server 110 deletes its copy of the message. It should be noted that in some circumstances, an electronic message may have multiple intended recipients and primary server 120 is responsible for forwarding the electronic message separately for each of the multiple intended recipients. For such instances, shadow server 110 may be adapted to maintain its copy of the electronic message until it has determined/received an indication that the electronic message has been forwarded to all of the plurality of intended recipients.

If at step 820, shadow server 110 determines that the message has not likely been communicated, at step 821, shadow server 110 determines whether or not primary server 120 has failed. Shadow server 110 may determine whether or not primary server 120 has failed by sending a request for primary server 120 to respond. If at step 821 it is determined that primary server 120 has not failed, processing continues at step 820. However it is determined at step 821 that primary server 120 has likely failed, at step 824, shadow server 110 assumes control and resends or forwards the message to the next appropriate server.

Example Computing Environment

Figure 9:
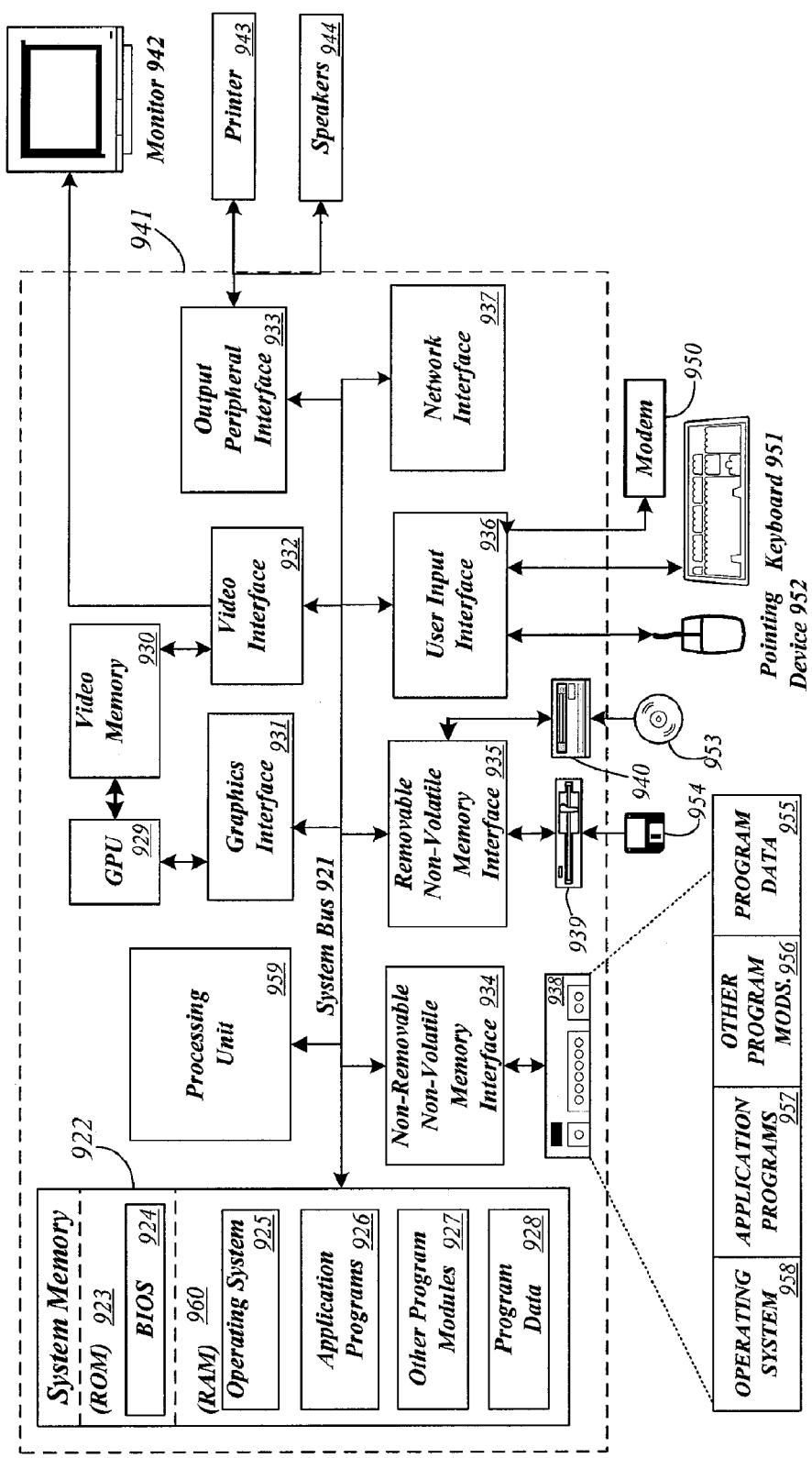
FIG. 9 is a block diagram of a computing environment with which aspects of the subject matter described herein may be deployed.

FIG. 9 depicts an example computing environment 920 that may be used in an exemplary computing arrangement 100. Example computing environment 920 may be used in a number of ways to implement the disclosed methods for providing high availability message transport. For example, computing environment 920 may operate as computer servers 110, 120, 130, 140, 150, and 160 to provide high availability message forwarding.

Computing environment 920 is only one example of a suitable computing environment and is not intended to suggest any limitation as to the scope of use or functionality of the subject matter disclosed herein. Neither should the computing environment 920 be interpreted as having any dependency or requirement relating to any one or combination of components illustrated in the example operating environment 920.

Aspects of the subject matter described herein are operational with numerous other general purpose or special purpose computing system environments or configurations. Examples of well known computing systems, environments, and/or configurations that may be suitable for use with the subject matter described herein include, but are not limited to, personal computers, server computers, hand-held or laptop devices, portable media devices, multiprocessor systems, microprocessor-based systems, set top boxes, programmable consumer electronics, network PCs, minicomputers, mainframe computers, distributed computing environments that include any of the above systems or devices, and the like.

An example system for implementing aspects of the subject matter described herein includes a general purpose computing device in the form of a computer 941. Components of computer 941 may include, but are not limited to, a processing unit 959, a system memory 922, and a system bus 921 that couples various system components including the system memory to the processing unit 959. The system bus 921 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 941 typically includes a variety of computer readable media. Computer readable media can be any available media that can be accessed by computer 941 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by computer 941. Communication media typically embodies computer readable instructions, data structures, program modules or other data in a modulated data signal such as a carrier wave or other transport mechanism and includes any information delivery media. The term "modulated data signal" includes a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 922 includes computer storage media in the form of volatile and/or nonvolatile memory such as read only memory (ROM) 923 and random access memory (RAM) 960. A basic input/output system 924 (BIOS), containing the basic routines that help to transfer information between elements within computer 941, such as during start-up, is typically stored in ROM 923. RAM 960 typically contains data and/or program modules that are immediately accessible to and/or presently being operated on by processing unit 959. By way of example, and not limitation, FIG. 9 illustrates operating system 925, application programs 926, other program modules 927, and program data 928.

Computer 941 may also include other removable/non-removable, volatile/nonvolatile computer storage media. By way of example only, FIG. 9 illustrates a hard disk drive 938 that reads from or writes to non-removable, nonvolatile magnetic media, a magnetic disk drive 939 that reads from or writes to a removable, nonvolatile magnetic disk 954, and an optical disk drive 940 that reads from or writes to a removable, nonvolatile optical disk 953 such as a CD ROM or other optical media. Other removable/non-removable, volatile/nonvolatile computer storage media that can be used in the example operating environment include, but are not limited to, magnetic tape cassettes, flash memory cards, digital versatile disks, digital video tape, solid state RAM, solid state ROM, and the like. The hard disk drive 938 is typically connected to the system bus 921 through a non-removable memory interface such as interface 934, and magnetic disk drive 939 and optical disk drive 940 are typically connected to the system bus 921 by a removable memory interface, such as interface 935.

The drives and their associated computer storage media discussed above and illustrated in FIG. 9, provide storage of computer readable instructions, data structures, program modules and other data for the computer 941. In FIG. 9, for example, hard disk drive 938 is illustrated as storing operating system 958, application programs 957, other program modules 956, and program data 955. Note that these components can either be the same as or different from operating system 925, application programs 926, other program modules 927, and program data 928. Operating system 958, application programs 957, other program modules 956, and program data 955 are given different numbers here to illustrate that, at a minimum, they are different copies. A user may enter commands and information into the computer 941 through input devices such as a keyboard 951 and pointing device 952, commonly referred to as a mouse, trackball or touch pad. Other input devices (not shown) may include a microphone, joystick, game pad, satellite dish, scanner, or the like. These and other input devices are often connected to the processing unit 959 through a user input interface 936 that is coupled to the system bus, but may be connected by other interface and bus structures, such as a parallel port, game port or a universal serial bus (USB). A monitor 942 or other type of display device is also connected to the system bus 921 via an interface, such as a video interface 932. In addition to the monitor, computers may also include other peripheral output devices such as speakers 944 and printer 743, which may be connected through an output peripheral interface 933.

Thus a system for providing redundant call servicing has been disclosed. In a disclosed embodiment, the system provides redundancy during the entire length of servicing of voice calls, and in particular, redundancy during voice mail recording. Those skilled in the technical area will appreciate that the system may be employed to provide redundancy during scenarios other than voice mail recording. For example, the redundant call servicing system may be employed to service voice mail users calling into check voice mail. Indeed, the disclosed systems and methods for sharing key state transitions between a primary and secondary server can be employed to provide redundancy for most, if not all, interactive voice response (IVR) services.

It should be understood that the various techniques described herein may be implemented in connection with hardware or software or, where appropriate, with a combination of both. Thus, the methods and apparatus of the subject matter described herein, or certain aspects or portions thereof, may take the form of program code (i.e., instructions) embodied in tangible media, such as floppy diskettes, CD-ROMs, hard drives, or any other machine-readable storage medium wherein, when the program code is loaded into and executed by a machine, such as a computer, the machine becomes an apparatus for practicing the subject matter described herein. In the case where program code is stored on media, it may be the case that the program code in question is stored on one or more media that collectively perform the actions in question, which is to say that the one or more media taken together contain code to perform the actions, but that—in the case where there is more than one single medium—there is no requirement that any particular part of the code be stored on any particular medium. In the case of program code execution on programmable computers, the computing device generally includes a processor, a storage medium readable by the processor (including volatile and non-volatile memory and/or storage elements), at least one input device, and at least one output device. One or more programs that may implement or utilize the processes described in connection with the subject matter described herein, e.g., through the use of an API, reusable controls, or the like. Such programs are preferably implemented in a high level procedural or object oriented programming language to communicate with a computer system. However, the program(s) can be implemented in assembly or machine language, if desired. In any case, the language may be a compiled or interpreted language, and combined with hardware implementations.

Although example embodiments may refer to utilizing aspects of the subject matter described herein in the context of one or more stand-alone computer systems, the subject matter described herein is not so limited, but rather may be implemented in connection with any computing environment, such as a network or distributed computing environment. Still further, aspects of the subject matter described herein may be implemented in or across a plurality of processing chips or devices, and storage may similarly be affected across a plurality of devices. Such devices might include personal computers, network servers, handheld devices, supercomputers, or computers integrated into other systems such as automobiles and airplanes.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A method implemented in a computing system of transporting an electronic message, comprising:
   receiving at a primary messaging server an indication, from a first messaging server, an electronic message is to be communicated to the primary messaging server,
   the primary messaging server comprising a first queue for storing electronic messages that the primary server has primary responsibility for transmitting to a next messaging server on the electronic message's path towards its intended destination, and a second queue for storing copies of electronic messages for which the primary server operates as a shadow messaging server, and
   the first messaging server comprising a first queue for storing electronic messages that the first messaging server has primary responsibility for transmitting to a next messaging server on the electronic message's path towards its intended destination, and a second queue for storing copies of electronic messages for which the first messaging server operates as a shadow messaging server;
   in response to receiving said indication an electronic message is to be communicated to the primary messaging server, the primary messaging server advertising that the primary messaging server is operable to work with a shadow messaging server to provide redundant communications;
   in response to the primary messaging server advertising that the primary messaging server is operable to work with a shadow messaging server, the primary messaging server receiving a communication from a the first messaging server opting-in as a shadow messaging server for the electronic message, wherein the communication from the first messaging server opting-in as a shadow messaging server for the electronic message communicates to the primary messaging server that the first messaging server will maintain a shadow copy of the electronic message after sending the electronic message to the primary messaging server;
   receiving, from the first messaging server, the electronic message at the primary messaging server;
   storing the electronic message in the first queue of the primary messaging server;
   storing the shadow copy of the electronic message in the second queue of the first messaging server;
   monitoring at the first messaging server for delivery of the electronic message by the primary messaging server to a third messaging server, the third messaging server being in the electronic message's path towards its intended destination;
   upon identifying, at the first messaging server that the primary messaging server has delivered the electronic message to the third messaging server, deleting the shadow copy of the electronic message from the second queue of the first messaging server; and
   upon determining at the first messaging server that the primary messaging server has not delivered the electronic message to the third messaging server, copying the shadow copy of the electronic message from the second queue of the first messaging server to the first queue of the first messaging server and communicating the shadow copy of the electronic message stored in the first queue of the first messaging server to the third messaging server, wherein said identifying comprises monitoring at the first messaging server for an indication from the primary messaging server that indicates that the primary messaging server has delivered the electronic message to the third messaging server, wherein said determining comprises identifying that the primary messaging server is not responding to requests from the first messaging server and has failed, and wherein the first messaging server, the primary messaging server and the third messaging server are SMTP email servers.

2. A tangible article of manufacture having computer memory storing information comprising:

computer readable instructions for communicating from a first SMTP messaging server to a second SMTP messaging server a message indicating an electronic message is to be communicated to the second SMTP messaging server, the second SMTP messaging server comprising a first queue for storing electronic messages that the second SMTP messaging server has primary responsibility for transmitting to a next messaging server on the electronic message's path towards its intended destination, and a second queue for storing copies of electronic messages for which the second SMTP messaging server operates as a shadow messaging server, and the first messaging server comprising a first queue for storing electronic messages that the first messaging server has primary responsibility for transmitting to a next messaging server on the electronic message's path towards its intended destination, and a second queue for storing copies of electronic messages for which the first messaging server operates as a shadow messaging server;

computer readable instructions adapted in response to receiving said indication an electronic message is to be communicated to the second SMTP messaging server, the second SMTP messaging server advertising that the second SMTP messaging server is operable to provide redundant communications;

in response to the second SMTP messaging server advertising that the second SMTP messaging server is operable to work with a shadow SMTP messaging server, the second SMTP messaging server receiving a communication from the first SMTP messaging server opting-in as a shadow messaging server for the electronic message, wherein the communication from the first messaging server opting-in as a shadow messaging sever for the electronic message communicates to the second SMTP messaging server that the first messaging server will maintain a shadow copy of the electronic message after sending the electronic message to the primary second SMTP messaging server;

computer readable instructions for communicating the electronic message from the first SMTP messaging server to the second SMTP messaging server;

computer readable instructions for storing the electronic message in the first queue of the second SMTP messaging server;

computer readable instructions for storing the shadow a copy of the electronic message in the second queue of the first messaging server;

computer readable instructions for monitoring at the first messaging server for delivery of the electronic message by the second SMTP messaging server to a third messaging server, the third messaging server being in the electronic message's path towards its intended destination;

computer readable instructions for, upon identifying, at the first messaging server that the second SMTP messaging server has delivered the electronic message to the third messaging server, deleting the shadow copy of the electronic message from the second queue of the first messaging server;

computer readable instructions for determining at the first SMTP messaging server that the second SMTP messaging server has not delivered the electronic message to a third SMTP messaging server, the third SMTP messaging server being in the electronic message's path towards its intended destination; and computer readable instructions for upon determining at the first SMTP messaging server that the second SMTP messaging server has not delivered the electronic message to the third SMTP messaging server, copying the shadow copy of the electronic message from the second queue of the first SMTP messaging server to the first queue of the first SMTP messaging server and communicating the electronic message stored in the first queue of the first SMTP messaging to the third SMTP messaging server, wherein said identifying comprises monitoring at the first messaging server an indication from the second SMTP messaging server that indicates that the second SMTP messaging server has delivered the electronic message to the third messaging server, and wherein determining at the first SMTP messaging server that the second SMTP messaging server has not delivered the electronic message comprises identifying that the second SMTP messaging server is not responding to requests from the first SMTP messaging server.

3. The article of manufacture of claim 2, wherein determining at the first SMTP messaging server that the second SMTP messaging server has not delivered the electronic message to a third SMTP messaging server comprises determining at the first messaging server no messages have been received from the second SMTP messaging server in a prescribed period of time.

4. The article of manufacture of claim 2, further comprising computer readable instructions for sensing at the first SMTP messaging server the second SMTP messaging server is operable to use shadowing services.

5. A system for transporting electronic messages, comprising:

a first messaging server adapted to process electronic messages, wherein said first messaging server comprises:
a first processor; and
memory comprising executable instructions adapted to be executed on the first processor, said executable instructions for performing the following:
receiving at a first messaging server, from a second messaging server, information indicating an electronic message is to be communicated to the first messaging server, the first messaging server comprising a first queue for storing electronic messages that the first messaging server has primary responsibility for transmitting to a next messaging server on the electronic message's path towards its intended destination, and a second queue for storing copies of electronic messages for which the first messaging server operates as a shadow messaging server;

advertising that the first messaging server is operable to work with a shadow messaging server to provide redundant communications;

in response to the first messaging server advertising that the first messaging server is operable to work with a shadow messaging server, the first messaging server receiving a communication from the second messaging server opting-in as a shadow messaging server for the electronic message, wherein the communication from the second messaging server opting-in as a shadow messaging server for the electronic message communicates to the first messaging server that the second messaging server will maintain a shadow copy of the electronic message after sending the electronic message to the first messaging server;

receiving, from the second messaging server, the electronic message at the first messaging server;

storing the electronic message in the first queue of the first messaging server; and communicating a copy of the electronic message to the third messaging server; and the second messaging server adapted to process electronic messages, said second messaging server, comprising:

a processor; and memory comprising executable instructions adapted to be executed on the processor, said executable instructions for performing the following:

storing a copy of the electronic message in a second queue of the second messaging server, the second messaging server comprising a first queue for storing electronic messages that the second messaging server has primary responsibility for transmitting, and a second queue for storing copies of electronic messages for which the second messaging server operates as a shadow server;

preparing and sending a communication to the first messaging server opting-in as a shadow messaging server for the electronic message, wherein the communication from the second messaging server opting-in as a shadow messaging server for the electronic message communicates to the first messaging server that the second messaging server will maintain a shadow copy of the electronic message after sending the electronic message to the first messaging server;

monitoring at the second messaging server for delivery of the electronic message by the first messaging server to a third messaging server, the third messaging server being in the electronic message's path towards its intended destination; and upon identifying that the first messaging server has communicated the electronic message to the third messaging server, deleting the copy of the electronic message from the second queue of the second messaging server; and upon determining at the second messaging server that the first messaging server has not delivered the electronic message to the third messaging server, copying the copy of the electronic message from the second queue of the shadow messaging server to the first queue of the second messaging server and communicating the electronic message stored in the first queue of the second messaging server to the third messaging server, wherein said identifying comprises monitoring at the second messaging server for an indication from the first messaging server that indicates that the first messaging server has delivered the electronic message to the third messaging server, wherein said determining comprises identifying that the first messaging server is not responding to requests from the second messaging server and has failed, and wherein the first messaging server, the second messaging server and the third messaging server are SMTP email servers.

6. The system of claim 5, wherein the instructions for communicating a copy of the electronic message to the second messaging server comprise instructions for communicating the electronic message to the second messaging server after receiving the electronic message at the first messaging server.

7. The system of claim 5 further comprising instructions for performing:

communicating the electronic message from the first messaging server to a third messaging server;

removing the electronic message from the first messaging server; and communicating to the second messaging server notice of the electronic message being communicated to a third messaging server.

* * * * *

UNITED STATES PATENT AND TRADEMARK OFFICE
CERTIFICATE OF CORRECTION

| | | |
|---|---|---|
| PATENT NO. | : 8,122,089 B2 | Page 1 of 1 |
| APPLICATION NO. | : 11/771164 | |
| DATED | : February 21, 2012 | |
| INVENTOR(S) | : Kay et al. | |

It is certified that error appears in the above-identified patent and that said Letters Patent is hereby corrected as shown below:

In the Claims

In column 14, line 37, In claim 1, delete "a the" and insert -- the --, therefor.

In column 15, line 51, In claim 2, delete "sever" and insert -- server --, therefor.

In column 15, line 54, In claim 2, after "to the" delete "primary".

In column 15, line 62, In claim 2, after "shadow" delete "a".

In column 16, line 25, In claim 2, after "messaging" insert -- server --.

Signed and Sealed this
Twentieth Day of January, 2015

Michelle K. Lee
*Deputy Director of the United States Patent and Trademark Office*